(12) United States Patent
Wolf et al.

(10) Patent No.: US 12,247,811 B2
(45) Date of Patent: Mar. 11, 2025

(54) ARMOR PLATE, ARMOR PLATE COMPOSITE AND ARMOR

(71) Applicant: KENNAMETAL INC., Latrobe, PA (US)

(72) Inventors: Manfred Wolf, Mistelgau (DE); Armin Helldoerfer, Mistelgau (DE); Werner Parlow, Mistelgau (DE); Thomas Theuerkauf, Mistelgau (DE)

(73) Assignee: KENNAMETAL INC., Latrobe, PA (US)

( * ) Notice: Subject to any disclaimer, the term of this patent is extended or adjusted under 35 U.S.C. 154(b) by 282 days.

(21) Appl. No.: 17/694,103

(22) Filed: Mar. 14, 2022

(65) Prior Publication Data

US 2023/0221099 A1    Jul. 13, 2023

(30) Foreign Application Priority Data

Jan. 12, 2022   (DE) .................. 102022100599.2

(51) Int. Cl.
*F41H 5/04*   (2006.01)
*B32B 9/04*   (2006.01)

(52) U.S. Cl.
CPC ........... *F41H 5/0492* (2013.01); *B32B 9/041* (2013.01); *B32B 2307/558* (2013.01); *B32B 2571/00* (2013.01); *B32B 2605/00* (2013.01)

(58) Field of Classification Search
None
See application file for complete search history.

(56) References Cited

U.S. PATENT DOCUMENTS

| | | |
|---|---|---|
| 2,723,214 A | 11/1955 | Meyer |
| 3,395,067 A | 7/1968 | Lane, Jr. et al. |
| 3,867,239 A | 2/1975 | Alesi et al. |
| 4,824,624 A | 4/1989 | Palicka et al. |
| 4,826,791 A | 5/1989 | Mehrotra et al. |
| 4,969,386 A | 11/1990 | Sandstrom et al. |
| 5,196,252 A | 3/1993 | Harpell |
| 5,227,346 A | 7/1993 | Hwang et al. |
| 5,361,678 A | 11/1994 | Roopchand et al. |
| 5,371,049 A | 12/1994 | Moffett et al. |
| 5,443,917 A | 8/1995 | Tarry |
| 5,648,042 A | 7/1997 | Miller, Jr. |
| 5,686,689 A | 11/1997 | Snedeker et al. |
| 5,760,331 A | 6/1998 | Lowden et al. |
| 5,763,813 A | 6/1998 | Cohen et al. |
| 5,866,839 A | 2/1999 | Ohayon |

(Continued)

FOREIGN PATENT DOCUMENTS

| | | |
|---|---|---|
| CA | 2282530 A1 | 12/1999 |
| CN | 103180685 A | 6/2013 |

(Continued)

OTHER PUBLICATIONS

International Search Report and Written Opinion for International Application No. PCT/EP2023/050417, mailed Apr. 17, 2023, 25 Pages.

(Continued)

*Primary Examiner* — Reginald S Tillman, Jr.
(74) *Attorney, Agent, or Firm* — Christopher J. Owens (57) ABSTRACT

An armor plate consists of a material comprising a cermet, and the armor plate has a density in the range from 5.0 to 6.5 g/cm³. An armor plate composite and an armor are provided as well.

11 Claims, 7 Drawing Sheets

(56) References Cited

U.S. PATENT DOCUMENTS

| | | | |
|---|---|---|---|
| 5,963,776 | A | 10/1999 | Lowden et al. |
| 6,009,789 | A | 1/2000 | Lyons |
| 6,010,580 | A | 1/2000 | Dandliker et al. |
| 6,124,225 | A | 9/2000 | Tien et al. |
| 6,135,006 | A | 10/2000 | Strasser et al. |
| 6,139,791 | A | 10/2000 | Chen et al. |
| 6,149,705 | A | 11/2000 | Lowden et al. |
| 6,203,908 | B1 | 3/2001 | Cohen |
| 6,248,150 | B1 | 6/2001 | Amick |
| 6,314,858 | B1 | 11/2001 | Strasser et al. |
| 6,389,594 | B1 | 5/2002 | Yavin |
| 6,457,417 | B1 | 10/2002 | Beal |
| 6,544,913 | B2 | 4/2003 | Kim et al. |
| 6,575,075 | B2 | 6/2003 | Cohen |
| 6,601,497 | B2 | 8/2003 | Ghiorse et al. |
| 6,693,054 | B1 | 2/2004 | Yeckley |
| 6,709,736 | B2 | 3/2004 | Gruber et al. |
| 6,749,802 | B2 | 6/2004 | Amick |
| 6,793,875 | B1 | 9/2004 | Shaw et al. |
| 6,799,518 | B1 | 10/2004 | Williams |
| 6,805,034 | B1 | 10/2004 | McCormick et al. |
| 6,845,719 | B1 | 1/2005 | Spencer |
| 6,912,944 | B2 | 7/2005 | Lucuta et al. |
| 6,960,319 | B1 | 11/2005 | Kapoor |
| 6,964,933 | B2 | 11/2005 | Yeckley |
| 7,049,256 | B2 | 5/2006 | Yeckley |
| 7,064,095 | B2 | 6/2006 | Mandal et al. |
| 7,069,836 | B1 | 7/2006 | Palicka et al. |
| 7,077,048 | B1 | 7/2006 | Anderson, Jr. et al. |
| 7,077,306 | B2 | 7/2006 | Palicka et al. |
| 7,094,717 | B2 | 8/2006 | Yeckley |
| 7,104,177 | B1 | 9/2006 | Aghajanian et al. |
| 7,117,780 | B2 | 10/2006 | Cohen |
| 7,223,709 | B2 | 5/2007 | Yeckley |
| 7,261,036 | B2 | 8/2007 | Bourne et al. |
| 7,309,673 | B2 | 12/2007 | Yeckley |
| 7,402,541 | B2 | 7/2008 | Cohen |
| 7,478,579 | B2 | 1/2009 | Carberry et al. |
| 7,514,383 | B2 | 4/2009 | Bitterlich et al. |
| 7,562,612 | B2 | 7/2009 | Lucuta et al. |
| 7,770,521 | B2 | 8/2010 | Williams et al. |
| 7,855,159 | B1 | 12/2010 | Yeckley |
| 7,866,248 | B2 | 1/2011 | Moore, III et al. |
| 7,886,666 | B2 | 2/2011 | Williams et al. |
| 7,992,500 | B2 | 8/2011 | Williams |
| 8,281,700 | B2 | 10/2012 | Cohen |
| 8,318,622 | B2 | 11/2012 | Yeckley |
| 8,367,576 | B2 | 2/2013 | Yeckley et al. |
| 9,040,160 | B2 | 5/2015 | Carberry et al. |
| 9,228,805 | B1 | 1/2016 | Littlestone et al. |
| 9,650,701 | B2 | 5/2017 | Parsons |
| 10,234,243 | B2 | 3/2019 | Ganor |
| 2002/0012768 | A1 | 1/2002 | Cohen |
| 2002/0094406 | A1 | 7/2002 | Cohen |
| 2004/0033883 | A1 | 2/2004 | Yeckley |
| 2004/0067838 | A1 | 4/2004 | Mandal et al. |
| 2004/0102305 | A1 | 5/2004 | Yeckley |
| 2004/0237763 | A1 | 12/2004 | Bhatnagar et al. |
| 2005/0189683 | A1 | 9/2005 | Yeckley |
| 2006/0027632 | A1 | 2/2006 | Akram |
| 2006/0048668 | A1 | 3/2006 | Williams |
| 2006/0060077 | A1 | 3/2006 | Lucuta et al. |
| 2006/0102276 | A1 | 5/2006 | DeWitt |
| 2006/0137517 | A1 | 6/2006 | Palicka et al. |
| 2006/0144281 | A1 | 7/2006 | Williams et al. |
| 2006/0178256 | A1 | 8/2006 | Yeckley |
| 2006/0276324 | A1 | 12/2006 | Cohen |
| 2006/0288855 | A1 | 12/2006 | Cohen |
| 2006/0288897 | A1 | 12/2006 | Williams et al. |
| 2009/0301337 | A1 | 12/2009 | Wilson et al. |
| 2010/0212486 | A1 | 8/2010 | Kurtz et al. |
| 2010/0288151 | A1 | 11/2010 | Williams et al. |
| 2011/0100245 | A1 | 5/2011 | Williams et al. |
| 2011/0168049 | A1 | 7/2011 | Williams et al. |
| 2011/0266719 | A1 | 11/2011 | Shen et al. |
| 2012/0090451 | A1 | 4/2012 | Joynt |
| 2012/0177941 | A1 | 7/2012 | Peterson et al. |
| 2012/0291621 | A1 | 11/2012 | Sayre et al. |
| 2013/0199360 | A1 | 8/2013 | Schaupert et al. |
| 2013/0220107 | A1 | 8/2013 | Gettle et al. |
| 2014/0076140 | A1 | 3/2014 | Ravid et al. |
| 2015/0253114 | A1 | 9/2015 | Neal |
| 2017/0299345 | A1 | 10/2017 | Waldrop |
| 2019/0017787 | A1 | 1/2019 | Arlen et al. |

FOREIGN PATENT DOCUMENTS

| | | |
|---|---|---|
| CN | 103589929 A | 2/2014 |
| CN | 108981470 A | 12/2018 |
| DE | 1952759 A1 | 4/1970 |
| DE | 102017116319 A1 | 1/2019 |
| DE | 102019116153 A1 | 12/2020 |
| WO | 9107633 A1 | 5/1991 |
| WO | 9427110 A1 | 11/1994 |
| WO | 2008100654 A2 | 8/2008 |
| WO | 2019016750 A1 | 1/2019 |

OTHER PUBLICATIONS

Aug. 19, 2011 Non-Final Office Action U.S. Appl. No. 12/416,564, 11 Pages.

Feb. 21, 2012 Notice of Allowance U.S. Appl. No. 12/416,564, 7 Pages.

Jun. 25, 2020 Non-Final OA U.S. Appl. No. 16/631,724, 05 Pages.

Sep. 17, 2020 Notice of Allowance U.S. Appl. No. 16/631,724, 10 Pages.

Sep. 3, 2021 Foreign First Office Action for CN Application No. CN201880045463.6, Application No. PCT/IB2018/055380, 18 Pages.

Jan. 20, 2022 EPO Notification R161 (1) & R.162EP Application No. 20822360.2, Translation, 3 Pages.

Mar. 15, 2022 Office Action (non-US) CN Application No. 110869693A, 15 Pages.

Jun. 27, 2022 Office Action (non-US) CN Application No. 110869693A.

Nov. 3, 2022 Foreign Office Action Chinese Application No. 2018800454636.6, 14 pages.

Dec. 1, 2022 Foreign Office Action United Kingdom Application No. GB2200122.6, 2 pages.

Feb. 11, 2023 Foreign Office Action Chinese Application No. CN202080042218.7, 23 Pages.

May 2, 2023 Foreign Office Action United Kingdom Application No. GB2200122.6, 2 Pages.

Jul. 12, 2023 Non-Final Office Action U.S. Appl. No. 17/618,620, 7 Pages.

Aug. 18, 2023 Foreign Office Action Chinese Application No. CN202080042218.7, 14 Pages.

Sep. 7, 2023 Final Rejection U.S. Appl. No. 17/618,620, 8 Pages.

Oct. 5, 2023 Foreign Office Action United Kingdom Patent Application No. GB20220000122, 2 Pages.

Oct. 13, 2023 Notice of Allowance for U.S. Appl. No. 17/618,620, 5 Pages.

Jan. 20, 2024 Foreign Office Action Chinese Application No. CN20208042218, 17 Pages.

Jul. 25, 2024 Non Final Rejection U.S. Appl. No. 18/411,653, 07 Pages.

Evans A.G., et al., "Fracture Toughness Determination by Indentation," Journal American Ceramic Society, vol. 59, No's. 7-8, pp. 371-372.

Extended European Search Report for European Application No. 08754822.8, mailed Nov. 28, 2012, 12 Pages.

International Preliminary Report on Patentability for International Application No. PCT/IB2018/055380, mailed Jan. 30, 2020, 7 Pages.

International Preliminary Report on Patentability for International Application No. PCT/IB2020/055448, mailed Dec. 23, 2021, 10 Pages.

International Preliminary Report on Patentability for International Application No. PCT/US2008/050461, mailed Jul. 14, 2009, 6 Pages.

(56) References Cited

OTHER PUBLICATIONS

International Search Report and Written Opinion corresponding to PCT/IB2020/055448, mailed Oct. 7, 2020, 11 pages.
International Search Report and Written Opinion for International Application No. PCT/IB2018/055380, mailed Nov. 28, 2018, 11 Pages.
International Search Report and Written Opinion for International Application No. PCT/US2008/050461, mailed Aug. 27, 2008, 7 Pages.
Mencik Z., et al., "Quantitative Phase Analysis of Synthetic Silicon Nitride by X-Ray Diffraction," Advances in X-Ray Analysis, 1979, vol. 23, pp. 375-379.
Supplementary European Extended Search Report and the European Search Opinion: European Application No. 20822360.2 , May 23, 2023, 16 Pages.
Aug. 21, 2024 EPO Notification R161(1) R.162 European Application No. EP237006689, 6 page.
Sep. 25, 2024 Foreign Office Action Chinese Application No. CN20208042218, 16 Pages.
International Preliminary Report on Patentability for International Application No. PCT/EP2023/050417, mailed Jul. 25, 2024, 14 Pages.

ARMOR PLATE, ARMOR PLATE COMPOSITE AND ARMOR

RELATED APPLICATION DATA

The present application claims priority to German Patent Application Number 10 2022 100 599.2 filed Jan. 12, 2022 which is incorporated herein by reference in its entirety.

FIELD

The invention relates to an armor plate (so-called add-on armor), an armor plate composite and armor, with which objects, in particular vehicles and mobile units, can be protected against the effects of projectiles, grenades or similar fire.

BACKGROUND

A variety of approaches for increasing ballistic resistance are known from the state of the art. Known are, for example, additionally mountable armor plates consisting of ceramic.

One challenge when designing armors is the need to find a compromise between achievable protective effect, weight, overall volume and costs.

The protective effect of armors can be compared using standardized guidelines. The protection levels for occupants of logistics and light armored vehicles, for example, are regulated in STANAG (Standardization Agreement) 4569.

Armor plates that consist of a material that contains tungsten heavy metal or tungsten carbide as an essential component are known from DE 10 2017 116 319. Due to their high density, such armor plates have a high overall weight to ensure an adequately high protective effect.

DE 10 2019 116 153 A1 describes armor plates having a thickness of at least 3 mm and an edge length of at least 20 mm, wherein the respective armor plate consists of a material made largely of a component selected from the group hard metal, cermet and/or combinations thereof. It has, however, been shown that such armor plates do not necessarily have a suitable combination of required mechanical properties. For many applications, it is in particular necessary to fall back on multicomponent cermets to achieve an adequate protective effect, as a result of which the costs for the armor plates are high.

SUMMARY

The object of the invention is to provide armor plates and armor having adequate ballistic resistance. The armor plates and the armor must in particular be inexpensive to produce.

The object of the invention is achieved by an armor plate consisting of a material comprising a cermet, wherein the armor plate has a density in the range from 5.0 to 6.5 g/cm$^3$, in particular a density in the range from 5.0 to 6.3 g/cm$^3$.

Cermets are characterized by high hardness and, compared to hard metals, a lower density, which is however sufficiently high to be able to provide a reliable protective effect against ballistic impacts.

In particular in comparison to armor plates made of ceramic material, such as silicon carbide, the armor plates according to the invention can have an overall thickness that is reduced by up to 50% for a similar overall weight, while at the same time achieving equivalent ballistic resistance.

It has in particular been found that, on the one hand, armor plates having a density in the range from 5.0 to 6.5 g/cm$^3$, in particular in the range from 5.0 to 6.3 g/cm$^3$, have such a high intrinsic weight with the typical dimensions of the armor plate that a reliable protective effect against ballistic impacts is achieved, but, on the other hand, do not have excessively high overall weight that can adversely affect the object or the person to be protected.

The material preferably consists of the cermet. In other words, the armor plate is preferably made of the cermet. The production of the armor plate is thus simplified even further. The overall weight of the armor plate can moreover be reduced significantly compared to the armor plates comprising or consisting of hard metal known in the prior art.

The cermet can comprise a titanium-based hard material as the main component, in particular a titanium-based hard material selected from the group TiC, TiCN and combinations thereof.

The material of the armor plate preferably has a titanium-based hard material content in the range from 60 to 95 weight percent relative to the overall weight of the material, particularly preferably in the range from 65 to 90 weight percent.

To further tailor the material properties, the cermet can comprise at least one further hard material selected from the carbides of tungsten, molybdenum and mixtures thereof in addition to the titanium-based hard material.

The content of the further hard material in the material of the armor plate is preferably up to 30 weight percent relative to the overall weight of the material, in particular from 1 to 30 weight percent, particularly preferably in the range from 8.5 to 25 weight percent.

In order to keep the costs of the armor plate and the effort involved in the production thereof as low as possible, the cermet is preferably free of carbides, nitrides and carbonitrides of tantalum and/or niobium. It has been shown that adequate ballistic resistance can be achieved even without these elements, provided that the other mechanical and/or physical properties of the armor plate are optimized.

In other words, the cermet of the material of the armor plate is in particular not a multicomponent cermet or a many-component cermet.

The cermet can comprise a binder, wherein the binder can be composed of the elements selected from the group cobalt, nickel, copper, iron and mixtures thereof; preferably selected from the group nickel, iron and mixtures thereof.

Aside from unavoidable impurities, the binder is particularly preferably made of nickel.

The content of the binder in the material of the armor plate is preferably 1 to 20 weight percent relative to the overall weight of the material, particularly preferably from 3 to 15 weight percent.

The less binder there is in the material of the armor plate, the more the properties of the armor plate resemble ceramic materials. In other words, as the binder content decreases, more brittle but also harder armor plates are obtained.

The more binder there is in the material of the armor plates, the more the properties of the armor plate resemble a metallic material. In other words, such materials are in particular characterized by increased toughness.

In one variant, the material of the armor plate consists of the following constituents: 65 to 95 weight percent of the titanium-based hard material selected from the group TiC, TiCN and combinations thereof, up to 30 weight percent, in particular 1 to 30 weight percent, of the further hard material selected from the group consisting of the carbides of tungsten, molybdenum and mixtures thereof, and 1 to 20 weight percent nickel as a binder, in each case relative to the overall weight of the material.

The material of the armor plate in particular has a compressive strength in the range from 4400 to 5800 MPa, preferably in the range from 4600 to 5700 MPa. Armor plates made of such a material have excellent ability to withstand compressive stresses without being overly brittle.

The compressive strength can be determined based on ASTM E9-89a and DIN ISO 4506, as described in the following.

First, a test specimen is produced, whereby a granulate comprising the components of the material is used in a die press for cylindrical specimens and, after sintering, a cylinder with a grinding allowance is produced. Sintering takes place in a sinter HIP furnace. The obtained cylinder is centerless ground to an outer diameter of 6.00±0.05 mm and a surface roughness $R_a$ of less than 0.8 µm. The end faces of the cylinder are ground flat on both sides in a plane-parallel manner to a length of 12.00±0.05, also producing a surface roughness Ra of less than 0.8 µm. No chamfer is applied.

The pressure test is carried out in the center of the pressure plates being used. Two hard metal plates with a polished surface having a roughness of 3 µm are used as a support, whereby the hard metal plates have a Vickers hardness (HV30) of 1600 or more, a thickness of at least 15 mm and a diameter of 40 mm.

A fatliquoring agent, for example Vaseline, is applied to both end faces of the cylinder. In addition, a steel strip foil having a thickness of 0.05 mm is placed between the specimen and the support on both sides. The steel strip foil has to be replaced after each measurement. The loading rate to fracture is 5.75 N/mm$^2$ s or less. During the test, the course of the measurement is recorded graphically, whereby the maximum force is used to determine the compressive strength.

To provide adequate resistance to mechanical penetration into the armor plate, said armor plate can have a Vickers hardness (HV30) in the range from 1000 to 2000, preferably in the range from 1300 to 1900.

The Vickers hardness can be determined in accordance with DIN EN ISO 6507-1:2018-07.

The armor plate in particular exhibits a Palmqvist fracture toughness $K_{1c}$ in the range from 6 to 12 MNm$^{-3/2}$, preferably in the range from 6.5 to 10.5 MNm$^{-3/2}$. The armor plate therefore in particular has a fracture toughness greater than that of conventional ceramic materials as used in armor plates, so cracks in the material are less likely to propagate.

The Palmqvist fracture toughness can be determined in accordance with ISO 28079:2009.

To ensure further improved resistance to deformation, the armor plate can have a transverse rupture strength in the range from 750 to 2000 MPa, preferably in the range from 1050 to 1950 MPa.

The transverse rupture strength can be determined in accordance with DIN EN ISO 3327:2009.

The armor plate preferably exhibits more than one of the aforementioned mechanical properties in the aforementioned ranges, particularly preferably all of the aforementioned mechanical properties.

The armor plate can have a thickness of 3.0 mm or more, for example 5.0 mm or more. In another variant, the armor plate has a thickness of 7.5 mm or more.

In order to limit the overall weight of the armor plate, the armor plate in one variant preferably has a thickness in the range from 3.0 to 8.0 mm, particularly preferably from 3.5 to 7.0 mm.

The dimensions of a single armor plate are preferably comparatively small. The armor plate has an edge length of 5.0 mm or more, for example, preferably of 10.0 mm or more.

As a compromise between good manufacturability on the one hand and a not unmanageable effort in the application of the individual plates on the other hand, edge lengths in the range of 10 to 150 mm have proven to be advantageous, in particular in the range of 20 to 100 mm or 20 to 50 mm.

The armor plates can have any geometry suitable for completely covering an underlying surface with a plurality of adjacently disposed armor plates, apart from joints between the adjacent armor plates.

The armor plates can thus in particular have a hexagonal, triangular, square or rectangular shape.

The armor plates preferably have a hexagonal shape.

In a preferred variant, an upper side of the armor plate is sandblasted. It has been found that, during sintering of the armor plates, the binder migrates to the surface of the green body to be sintered, thereby creating a binder-enriched zone at the surface and a binder-depleted zone beneath the surface which can have a thickness of about 20 to 30 µm. By sandblasting the upper side of the armor plate, the binder-enriched zone can be removed at least partially, preferably completely. This makes it possible to further increase the mechanical stability of the armor plate.

The armor plate can therefore have a gradient structure, in which the binder-depleted zone is left on the surface of the armor plate after sandblasting.

The binder-depleted zone can optionally be removed as well.

The upper side of the armor plate, in particular, is the surface of the armor plate that is most likely to be subjected to ballistic impacts when the armor plate is in the installed position. In other words, the upper side of the armor plate forms an outer side.

The sandblasted upper side can also be used to bond the armor plate to a substrate, such as a carrier or another armor plate. The roughness of the surface, the magnitude of which can be set via sandblasting as known in the prior art, makes it possible to achieve particularly good adhesive bonding, and thus a particularly stable connection of the armor plate to the substrate.

The armor plate can also be sandblasted on more than one lateral surface, for example on the upper side and on an underside opposite to the upper side.

According to the invention, the aforementioned object is also achieved by providing an armor plate composite comprising at least two layers of armor plates of the abovementioned type which are connected to one another.

The layers of armor plates can comprise armor plates of different or the same material. It is thus possible to implement tailored armor plate composites in sandwich construction.

The armor plates of the layers can have the same or different thicknesses, edge lengths and/or cross-sections.

In one variant, the individual armor plates of the different layers are placed congruently on top of one another. This allows the armor plate composite to easily be replaced as a whole.

In an alternative variant, the armor plates of the layers are offset to one another. This ensures that there are no exposed continuous joints between the armor plates in an armor composed of the armor plate composites. This prevents the development of less stable regions in an armor composed of such an armor plate composite.

The individual layers of the armor plate composite can in particular be connected to one another by gluing, sintering, screwing and/or soldering.

A silicone-based adhesive can be used as the adhesive.

To ensure a sufficiently stable connection, the solder used should be a hard solder.

The object is further solved according to the invention by an armor comprising a carrier, an armor layer and an adhesive layer by means of which the armor layer is connected to the carrier, whereby the armor layer is composed of a plurality of armor plates and/or armor plate composites of the aforementioned type.

The armor layer can include armor plates and/or armor plate composites of different materials.

The adjacently disposed armor plates applied to the carrier can thus be made of the same and/or different materials.

The plurality of armor plate composites of the armor applied to the carrier can likewise each consist of the same sequence of layers of armor plates, or can have a different sequence of layers of armor plates of different materials.

The gap widths of the joints between the armor plates and/or the armor plate composites can be in a range from 0.01 to 0.8 mm. With larger gap widths, the armor does not provide an adequate protective effect. An irregular gap width can also mean that the surface under the armor plates and/or the armor plate composites cannot be completely covered. Smaller gap widths, on the other hand, can only be achieved with much effort.

If necessary, the peripheral surfaces of the armor plates and/or armor plate composites can be ground prior to being mounted on the carrier to compensate for the manufacturing-related tolerances of the edge lengths.

The adhesive layer serves as mechanical damping between the armor plates or the armor plate composites and the carrier, which increases the protective effect. At the same time, it is possible to replace the individual armor plates and armor plate composites separately, for example if one of them is damaged after being under fire.

The adhesive layer is in particular a permanently elastic adhesive layer.

The adhesive layer preferably has a thickness of at least 3.0 mm, and in particular a thickness in the range from 3.0 to 3.5 mm. A thicker adhesive layer increases the ability of the armor to absorb energy when under fire. At the same time, however, as little adhesive as possible should be used in order to save costs, and to allow easy replacement of individual armor plates or armor plate composites when necessary.

The adhesive layer can be applied to the carrier as a continuous, flat layer.

According to one variant, the adhesive layer has a wavy profile when viewed in section, whereby air is trapped between adjacent wave crests. This increases the elasticity of the adhesive layer. The air can be on the side of the armor plates and/or the armor plate composites. In other words, the adhesive layer is applied to the carrier and the armor plates and/or the armor plate composites are then mounted on the adhesive layer. Such an embodiment can in particular be advantageous when mounting the armor during production, whereas a flat adhesive layer is available as a simple alternative for repairs.

The adhesive of the adhesive layer should ensure sufficient adhesion of the components of the armor connected by means of the adhesive layer in a temperature range from −50° C. to +80° C.

The adhesive layer is preferably a silicone-based adhesive. Said adhesive is characterized by good elasticity with a high adhesive effect and at the same time good resistance to aging while covering a wide temperature range.

The adhesive of the adhesive layer and the adhesive connecting the individual layers of the armor plate composite can be the same or different adhesives. The advantages and considerations regarding the adhesive of the adhesive layer apply analogously to the adhesive connecting the individual layers of the armor plate composite.

Likewise, the thickness of the adhesive layer between the carrier and the armor layer between the individual layers of the armor plate composite can be different or the same.

Alternatively, the adhesive layer can also be realized using a hard solder instead of an adhesive. The armor layer can also be fastened to the carrier mechanically.

The carrier preferably consists of a material with which the carrier itself already provides a certain protective effect. The carrier can be composed of a material selected from the group high-strength steel, aluminum, aluminum alloys, titanium, titanium alloys, synthetic fiber composite materials and/or combinations thereof.

Armor steel, in particular, can be used as the high-strength steel. A suitable synthetic fiber composite material is in particular Kevlar.

In one embodiment, a fragment protection is applied to the side of the armor layer opposite to the adhesive layer. This prevents excessive spelling of the material of the armor layer under fire.

The fragment protection can be glued directly to the armor layer.

The fragment protection can be made of steel, high-strength steel, titanium, titanium alloys, aluminum, aluminum alloys, and/or composite materials. In particular carbon- and/or plastic-based materials can be used as the composite material.

It is also possible to apply additional protection to the side of the carrier opposite to the adhesive layer. This serves to absorb smaller fragments of the carrier and/or the projectile that can occur when the armor is under fire.

In particular foils and/or mats made of in particular carbon- and/or plastic-based composite materials can be used as the additional protection.

The additional protection can likewise be fastened to the carrier by gluing or via a mechanical connection.

In another embodiment, the carrier is the outer side of an object provided with the armor, in particular a vehicle or a mobile unit. Here and in the following, mobile unit refers in particular to temporary infrastructure, for example a container. The vehicle can also be an aircraft, a helicopter, or a ship.

It is thus possible for armor according to the invention to be mounted directly on the outer side of an already existing object, even retroactively. The present invention is thus also suitable for realizing additional armor in a simple manner.

In another embodiment, spacers connecting the carrier to the outer side of the object can be mounted between the carrier and the outer side of the object provided with the armor, in particular a vehicle or a mobile unit.

This makes it possible to also mount the armor according to the invention on objects, the outer surfaces of which do not allow the armor to be mounted directly. The spacing between the carrier and the outer side of the object also provides additional space to intercept smaller fragments of the carrier and/or the projectile so that they cannot damage the outer layer of the object.

BRIEF DESCRIPTION OF THE DRAWINGS

Further features and advantages of the invention result from the following description of exemplary embodiments, from the examples and from the drawings. The figures show.

The same reference signs are used in all figures for the same parts and components, and the corresponding advantages and characteristics listed in relation to one embodiment apply analogously to the components having the same reference sign in different embodiments.

DETAILED DESCRIPTION

Structure and Design of Armor Plates, Armor Plate Composites and Armor

Figure 1:
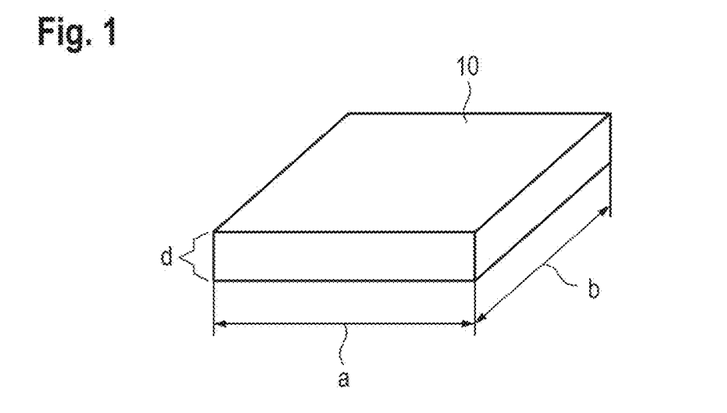
FIG. 1 an armor plate according to the invention in a perspective, schematic view.

FIG. 1 schematically shows an armor plate 10 according to the invention, which in the shown design example is rectangular and has a constant thickness d.

The thickness d is several millimeters and depends on the desired protective effect. The armor plate preferably has a thickness greater than 3 mm or more.

The thickness of the armor plate 10 is always selected such that the plate as such is inherently stable and is destroyed only when under fire.

The dimensions of the armor plate 10 are comparatively low. The edge lengths a and b are in the order of 10 mm to 150 mm and preferably in the range from 20 to 50 mm. It goes without saying that the exact dimensions for the intended location of use can be selected by the skilled person as required.

The armor plate 10 is a solid part of a material comprising a cermet, whereby the armor plate 10 has a density in the range from 5.0 to 6.5 g/cm$^3$.

The customary sintering processes generally known in the prior art for these materials can be used to produce the armor plate 10.

Figure 2:
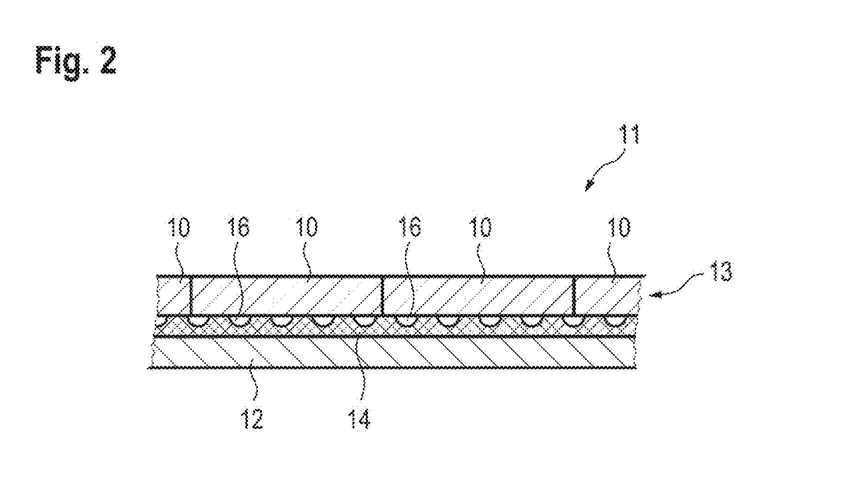
FIG. 2 armor according to the invention with a carrier onto which a plurality of armor plates according to FIG. 1 are glued by means of an adhesive layer in cross-section.

FIG. 2 shows the structure of an armor 11 according to the invention comprising a plurality of the armor plates 10 shown in FIG. 1.

The armor 11 shown in FIG. 2 uses a carrier 12 onto which the armor plates 10 are glued adjacent to one another. The armor plates 10 accordingly form an armor layer 13 of the armor 11.

In the shown embodiment, the carrier 12 consists of a steel alloy, in particular a high-strength steel alloy as used in the armoring of vehicles, for example armor steel.

In principle, however, a large number of other materials besides high-strength steel are suitable for the carrier 12, for example aluminum, aluminum alloys, titanium, titanium alloys, synthetic fiber composite materials and/or combinations thereof.

The armor plates 10 are glued to the carrier 12 by means of a first adhesive layer 14. The adhesive forming the first adhesive layer 14 is a silicone-based adhesive.

In principle, it is conceivable to use an adhesive layer with a constant thickness, so that a continuous, flat adhesive layer 14 is applied to the carrier 12.

The embodiment in FIG. 2 shows an alternative form of the adhesive layer 14, in which said adhesive layer has a generally wavy profile when viewed in cross-section. The armor plates 10 are consequently only in contact with the (flattened) wave crests of the first adhesive layer 14. "Channels" 16 are formed between the individual wave crests, each of which is filled with air.

Such an adhesive layer 14 is more complex to produce, however, so that this embodiment is primarily suitable for the initial production of armor 11. On the other hand, if the armor 11 only needs to be repaired, or if the manufacturing process is to be further simplified, a flat adhesive layer 14 can be used as well.

The particular advantage of the armor 11 shown in FIG. 2 is that the individual armor plates 10 can easily be replaced separately should this be necessary. The first adhesive layer 14 ensures mechanical damping between the armor plates 10 and the underlying carrier 12, which increases the protective effect.

Figure 3A:
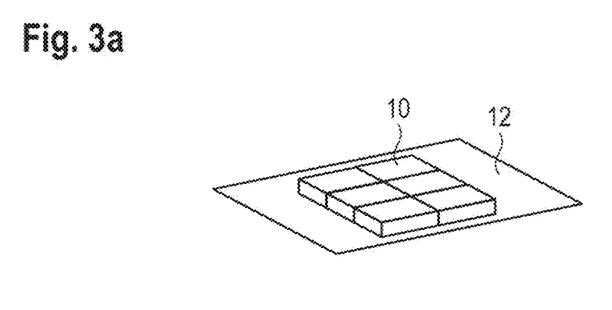
FIGS. 3a to 3c perspective views of various geometries of the armor plate according to FIG. 1.
Figure 3B:
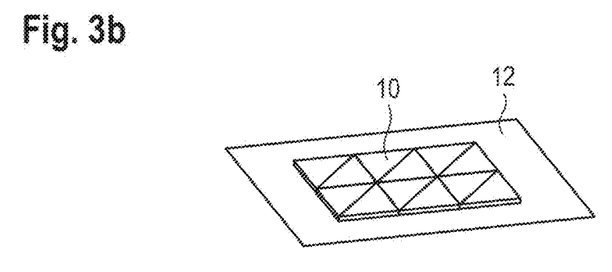
Figure 3C:
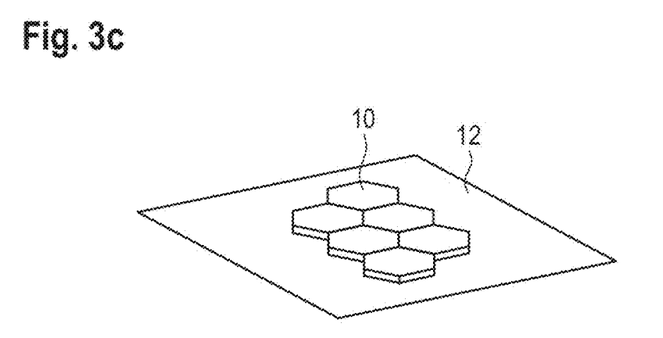

In deviation from the rectangular shape of the armor plates 10, in principle any shape can be used that is suitable for completely covering an underlying surface (apart from joints between the adjacent armor plates 10) with a plurality of adjacently disposed armor plates. Therefore, different geometries of the armor plates 10 are shown in FIGS. 3a to 3c. For example, the armor plates 10 can be square or rectangular (FIG. 1 and FIG. 3a), triangular (FIG. 3b), or hexagonal (FIG. 3c).

The joints between adjacent armor plates 10 should have a width in the range from 0.01 to a maximum of 0.08 mm so as to ensure a sufficiently good protective effect of the armor 11. If necessary, the individual armor plates 10 can be ground to the desired size after the manufacturing process in order to eliminate manufacturing-related tolerances and ensure sufficiently small joints.

Figure 4:
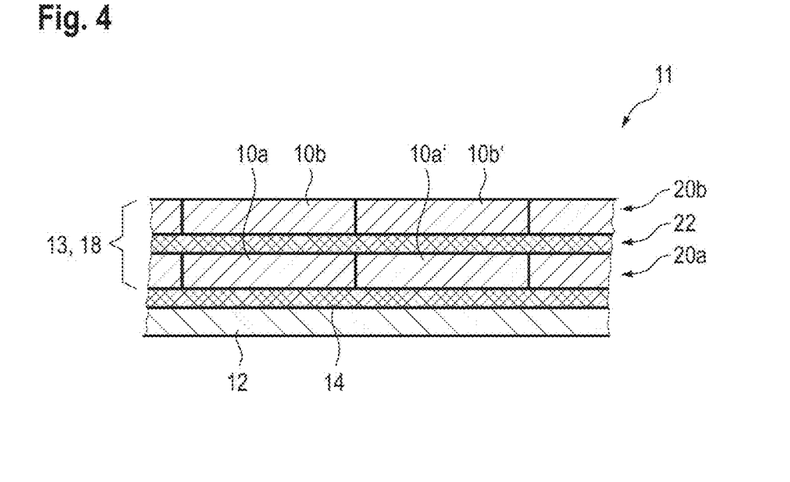
FIG. 4 armor according to the invention with a carrier onto which a plurality of armor plate composites according to the invention comprising the armor plate according to FIG. 1 are glued by means of an adhesive layer in cross-section.

FIG. 4 shows a further embodiment of the armor 11, which comprises an armor plate composite 18 that forms the armor layer 13.

The armor plate composite 18 is glued to the carrier 12 by means of the first adhesive layer 14. The first adhesive layer 14 is implemented with a constant thickness.

The armor plate composite 18 comprises a plurality of layers 20a and 20b, which are connected to one another by means of a second adhesive layer 22 ("sandwich construction"). In this case, the whole armor plate composite 18 forms the armor layer 13 of the armor 11a.

Each of the layers 20a and 20b comprises a plurality of armor plates 10a and 10b, whereby the material of which the armor plates 10a and 10b are made can differ between the layers 20a and 20b.

The armor plates 10a and 10b can comprise or consist of cermets having different compositions, for example.

The armor plates can furthermore also differ within one or each of the layers 20a and 20b, so that different armor plates 10a and 10a' or 10b and 10b' are used, for example.

An optimal compromise between the protective effect, the cost and the weight of the armor 11 can thus be made via the selection of the materials of the armor plates 10a and 10b.

In this embodiment, there are overall two layers 20a and 20b made of armor plates 10a and 10b. Even so, the armor plate composite 18 can also consist of more than two layers. It is, however, advantageous to use as few layers as possible to achieve the desired protective effect, and in particular only one layer as shown in FIG. 1, in order to keep the weight of the armor 11 as low as possible.

The possible maximum usable overall weight of the armor 11 is usually determined by the object that is to be provided with the armor 11.

Compared to the embodiment shown in FIG. 2, the individual armor plates 10a and 10b can have a smaller thickness, so that the armor plate composite 18 overall has a thickness analogous to the thickness of the armor layer 13 of FIG. 1.

The first adhesive layer 14 and the second adhesive layer 22 can use the same or different adhesives. The second adhesive layer can also have "channels" 16 like the first adhesive layer 14, or a constant thickness as shown in FIG. 4. The second adhesive layer 22 ensures mechanical damping between the armor plates 10a and 10b or 10a' and 10b'.

As is the case with the first adhesive layer 14, the layers 20a and 20b can also be connected to one another by means of sintering, screwing or soldering, in particular hard soldering, instead of via the second adhesive layer 22.

In the embodiment shown in FIG. 4, the layers 20a and 20b of the armor plate composite 18 are arranged one above the other such that, viewed in cross-section, the armor plates 10a and 10b of layers 20a and 20b are arranged one above the other, so that the armor plates 10a and 10b lie congruently one above the other, thus also positioning the joints between the armor plates 10a and 10b one above the other. If the joint width is sufficiently small, it has been shown that no impairment of the protective effect of the armor 11 is to be expected in this case either. With such an arrangement, it is particularly easy to replace individual armor plates 10a and 10b as well as entire armor plate composites 18, for example after damage to the armor 11a.

The armor plates 10a and 10b can alternatively also be arranged offset to one another, so that the joints between the individual armor plates 10a and 10b are not positioned exactly one above the other. Even if the protective effect of the armor 11 can theoretically be further increased in this way, in particular with respect to the event of repeated ballistic impact at the same location of the armor 11, the cost of a repair increases in such an embodiment.

Consequently, there has to be a trade-off between manufacturing costs, stability of the armor and the effort in the event of a repair.

Figure 5:
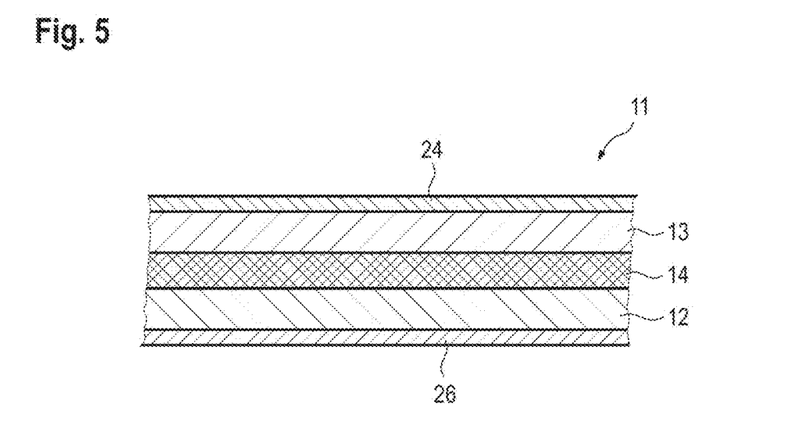
FIG. 5 an alternative embodiment of an armor of FIG. 2 with a fragment protection and an additional protection in cross-section.

FIG. 5 shows a further embodiment of the armor 11, in which a fragment protection 24 is applied, in particular glued, to the side of the armor layer 13 opposite to the adhesive layer 14.

The armor layer 13 can be constructed of individual armor plates 10 or of armor plate composites 18 as in the embodiments shown above.

The fragment protection 24 is, for example, made of steel, high-strength steel, titanium, titanium alloys, aluminum, aluminum alloys, composite materials in particular carbon- and/or plastic-based, and/or combinations thereof.

The fragment protection 24 generally has a smaller thickness than the armor layer 13.

If a projectile hits the armor 11, for example, the armor plates 10 of the armor layer 13 can fragment as a result of the impact. The fragment protection 24 ensures that these fragments cannot spall off the surface of the armor 11b to any significant degree. It has been shown that this can further increase the stability of the armor layer 13 as a whole and thus the protective effect of the armor 11.

The armor 11 shown in FIG. 5 further comprises an additional protection 26 on the side of the carrier 12 opposite to the adhesive layer 14. The additional protection 26 is in particular glued and/or mechanically fastened to the carrier 12.

In particular foils and/or mats made of in particular carbon- and/or plastic-based composite materials can be used as the additional protection.

The additional protection 26 serves to absorb smaller fragments of the carrier 12 and/or the projectile that can occur when the armor is under fire.

Figure 6:
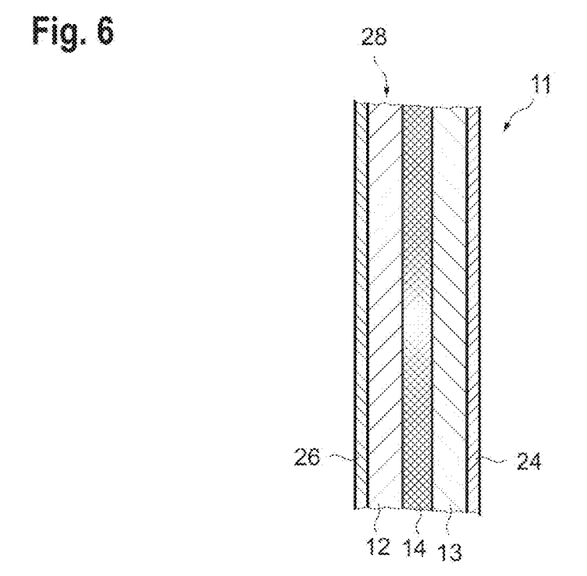
FIG. 6 a cross-section through a further alternative embodiment of the armor of FIG. 2.

FIG. 6 shows a further embodiment of the armor 11, which comprises the fragment protection 24 and the additional protection 26 analogous to FIG. 5. In the embodiment shown in FIG. 6, however, the carrier 12 is the outer side 28 of an object provided with the armor 11, so that part of the object itself is also part of the armor 11.

The object is a vehicle or a mobile unit, for example. Mobile unit here refers in particular to temporary infrastructure, for example a container.

An already existing protective effect of the object, for example the armored outer layer of a vehicle, can thus be exploited and its protective effect merely supplemented by the additional components of the armor 11. A retrofitting of already existing objects with the armor 11 is thus easily possible as well.

The additional protection 26 is in particular advantageous in an embodiment according to FIG. 6, for example when an occupant of an armored vehicle is positioned directly behind the carrier 12. Even if the projectile that hits the armor 11 when it is under fire, for example, cannot penetrate said armor, fragments could spall off the carrier 12 in the direction of the occupant and injure him. This is effectively prevented by the additional protection 26.

Since the armor layer 13 and the carrier 12 absorb most of the force of the impact, the parts of the carrier 12 that spall off in the direction of the occupant hardly have any penetrating power, so that a thin foil and/or mat is sufficient as the additional protection 26.

Figure 7:
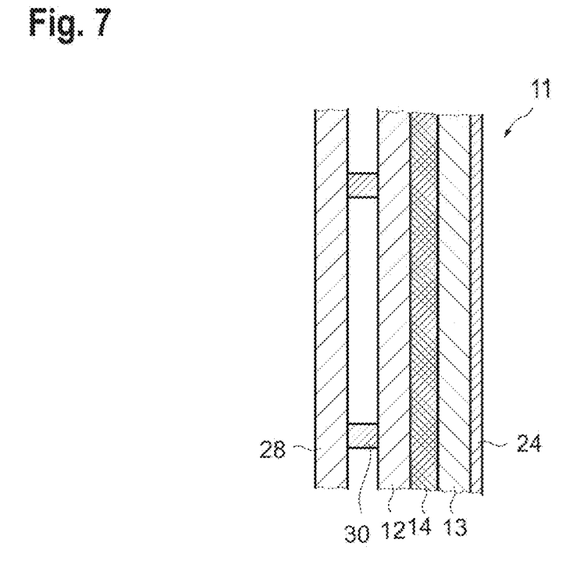
FIG. 7 a cross-section through yet another alternative embodiment of the armor of FIG. 2 with spacers.

FIG. 7 shows yet another embodiment of the armor 11, wherein the armor 11 is fastened to the outer side 28 of an object with the aid of spacers 30, in particular on the outer side of a vehicle or a mobile unit.

Such an embodiment is suitable in particular when the carrier 12, the armor layer 13 and/or the adhesive layer 14 cannot be mounted directly on the outer side 28 or the outer side 28 itself is not made of a sufficiently stable material, so that an embodiment according to FIG. 6 cannot be realized.

The spacers 30 additionally ensure that fragments or spellings of the carrier 12, for example, do not strike the outer side 28 directly when the armor 11 is under fire.

Accordingly, no additional protection 26 is provided in the embodiment according to FIG. 7.

The spacers 30 also make it easy to replace the armor 11 in the event of damage, because the armor only has to be detached from the spacers 30 and new armor 11 mounted at the damaged location.

Ballistic Tests 1

Table 1 shows compositions of armor plates tested as examples and Table 2 shows their physical and mechanical properties.

TABLE 1

Compositions of the material of the armor plates; all content information is based on the overall weight of the material.

| Specimen | TiC | TiCN | WC | Mo$_2$C | Co | Ni | Fe |
|---|---|---|---|---|---|---|---|
| A | 71.00 | — | — | 9.00 | — | 20.00 | — |
| B | 77.50 | — | — | 9.00 | — | 13.50 | — |
| C | 81.00 | — | — | 9.00 | — | 10.00 | — |
| D | 85.00 | — | — | 9.00 | — | 6.00 | — |
| E: | 88.00 | — | — | 9.00 | — | 3.00 | — |
| F | 33.50 | 33.50 | 11.00 | 9.50 | 8.30 | 4.20 | — |
| G | 81.00 | — | — | 9.00 | — | 7.50 | 2.50 |

TABLE 2

Properties of the armor plates

| Specimen | Density in g/cm$^3$ | Compressive strength in MPa | Vickers hardness HV30 | Fracture toughness $K_{1c}$ in MNm$^{-3/2}$ | Transverse rupture strength in MPa |
|---|---|---|---|---|---|
| A | 5.80 | n.d. | 1380 | 10.4 | 1650 |
| B | 5.60 | n.d. | 1570 | 8.4 | 1700 |
| C | 5.50 | n.d. | 1680 | 8.0 | 1600 |
| D | 5.40 | n.d. | 1770 | 7.0 | 1350 |
| E | 5.30 | 4680 | 1850 | 6.7 | 1100 |
| F | 6.10 | 5640 | 1690 | 8.5 | 1900 |
| G | 5.50 | n.d. | 1680 | 7.1 | 1380 |
| H* (SiC) | 3.15 | 3500 | 2200-2500 | 3.2 | 400 | n.d.: not determined
*Literature references

From Tables 1 and 2 it can be seen that the density can be reduced, the hardness can be increased, the fracture toughness can be lowered and the transverse rupture strength can be decreased by increasing the proportion of titanium-based hard material. A tailored characteristic profile of the armor plate according to the invention can thus be achieved via the selection of the proportions of titanium-based hard material.

Figure 8:
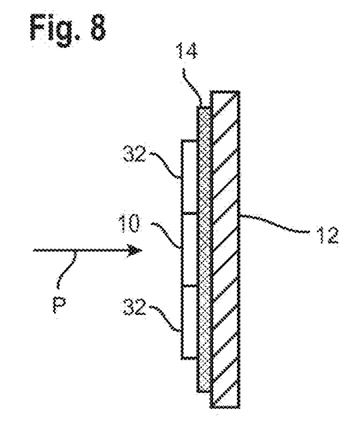
FIG. 8 a schematic cross-section of a test setup for a ballistic test of the armor plate according to FIG. 1.
Figure 9:
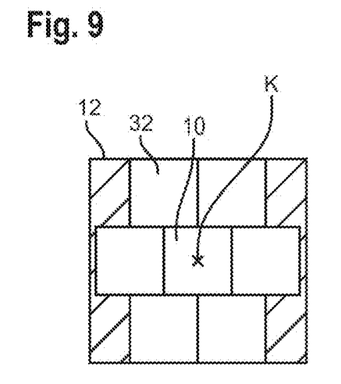
FIG. 9 a schematic front view of the test setup of FIG. 8.

FIGS. 8 and 9 schematically show a cross-section of a first test setup for testing the behavior of the armor plates according to the invention under fire.

In the first test setup, the respective armor plate 10 to be tested was fastened to a carrier by means of a 3 mm thick adhesive layer and an 8.5 mm thick plate of armor steel Armox® 500T was used as the carrier.

Support plates 32 were mounted on the carrier peripherally adjacent to the armor plate 10 to be tested. Armor plates of the same size as the armor plate 10 to be tested were used as the support plates 32.

Plates having the following composition were used as support plates 32: 63 weight percent TiCN, a total of 25 weight percent of WC, Mo$_2$C, TaC and NbC, as well as 8 weight percent Co and 4 weight percent Nickel. The support plates had a density of 6.45 g/cm$^3$ and a Vickers hardness (HV30) of 1650.

The tested armor plates had an edge length of 22.8 mm.

The center of the armor plate 10 to be tested was fired upon with a 7.62×51 AP8 caliber cartridge with a target velocity of 930 m/s.

In FIG. 8, the direction of fire is indicated by the arrow B and, in FIG. 9, the location of impact is indicated by the cross K.

Table 3 shows the results of the ballistic tests for different thicknesses of the armor plates.

TABLE 3

Results of the ballistic tests 1.

| | Plate thickness in mm | | | | |
|---|---|---|---|---|---|
| Specimen | 4.0 | 5.0 | 5.7 | 6 | 7 |
| C | n.d. | Penetration | Penetration | Stopped | Stopped |
| E | n.d. | Penetration | Stopped | Stopped | Stopped |
| F | Penetration | Stopped | n.d. | Stopped | Stopped |
| G | n.d. | Penetration | n.d. | Stopped | Stopped | n.d.: not determined

Table 3 shows that all of the tested compositions are suitable as material for armor plates. It can be seen that higher density plates tend to allow for thinner armor plates that withstand ballistic impact. It follows that, in the case of lower density armor plates, the resulting overall weight can still be kept comparatively constant.

Ballistic Tests 2

Figure 10:
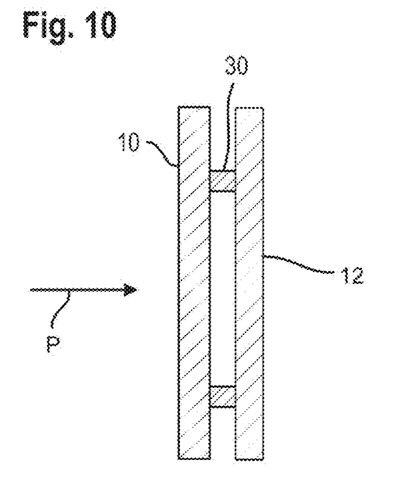
FIG. 10 a schematic cross-section of an alternative test setup fora ballistic test of the armor plate according to FIG. 1.

FIG. 10 schematically shows a cross-section of an alternative test setup for testing the behavior of the armor plates according to the invention under fire.

In the alternative test setup, the armor plate 10 to be tested was mounted on a carrier 12 via spacers 30 as a composite system consisting of fragment protection, armor plate, adhesive layer and additional protection, also referred to as "baking", whereby an air gap having a thickness of 15 mm was created between the composite system and the carrier.

An 8.5 mm thick plate made of 500 HB armored steel was used as the carrier.

Table 4 shows the results of the ballistic tests according to STANAG 4569. In the case of multiple impact ballistic tests, the stated target velocities refer to the target velocities of the successive rounds of firing.

TABLE 4

Results of the ballistic tests 2

| Cartridge | Type of fire | Target speed in m/s | Specimen E | Specimen F |
|---|---|---|---|---|
| 7.62 × 51 AP | Repeated fire | E: 931, 937, 927, 922; F: 928, 922, 923, 928 | Stopped | Stopped |
| | Single fire | E: 982; F: 993 | Stopped | Stopped |
| | | E: 873; F: 866 | Stopped | Stopped |
| | | E: 826; F: 810 | Stopped | Stopped |
| 7.62× 54R B32 API Dragunov | Single fire | E: 867, 861, 855, 851; F: 859, 852, 857, 862 | Stopped | Stopped |
| FSP20 | Single fire | F: 799 | n.d. | Stopped |
| | | F: 820 | n.d. | Stopped |
| | | F: 851 | | Stopped |
| | | F: 900 | | Stopped |
| | | E: 971; F:964 | Stopped | Stopped |
| | | E: 1008; F: 1012 | Stopped | Stopped | n.d.: not determined

Specimens E and F had the same compositions as discussed above for the ballistic tests 1.

The armor plates of Specimen E were tested at a thickness of 5.2 mm and the armor plates of Specimen F were tested at a thickness of 5.9 mm.

The tested armor plates had an edge length of 11.5 mm and a hexagonal shape.

From Table 4, it can be seen that the armor plates according to the invention reliably stop the projectile in the case of a single ballistic impact and also in the case of multiple ballistic impacts according to STANAG 4569.

Surface Treatment

Armor plates having the compositions according to Specimens E and F were additionally examined using scanning electron microscopy (SEM).

Figure 11:
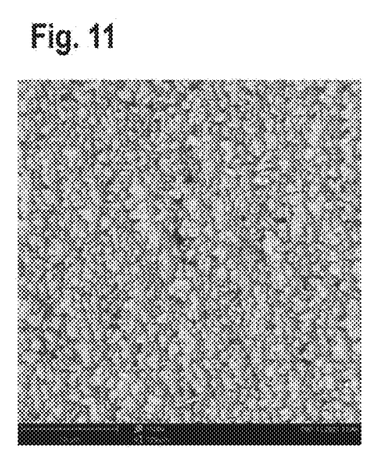
FIGS. 11-18 SEM images of armor plates according to the invention according to FIG. 1.
Figure 13:
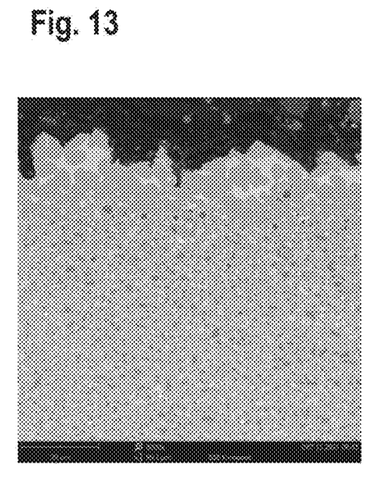

FIG. 11 and FIG. 13 show a surface photo and a sectional image onto or through an armor plate according to Specimen E. In particular in FIG. 13, it can be clearly seen that the binder accumulates on the upper side of the armor plate (bright regions in the SEM image), as a result of which a binder-depleted zone forms below this region.

This effect is attributed to diffusion effects during sintering of the armor plate and results in a gradient structure of the armor plate across its thickness, which can reduce the robustness of the armor plate.

Figure 12:
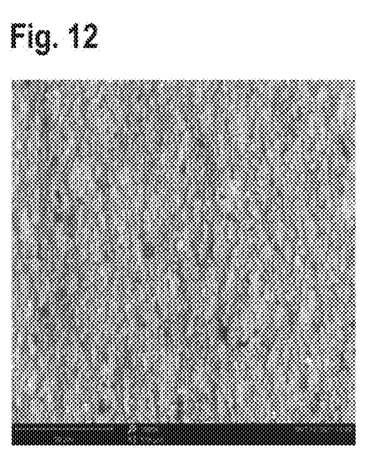
Figure 14:
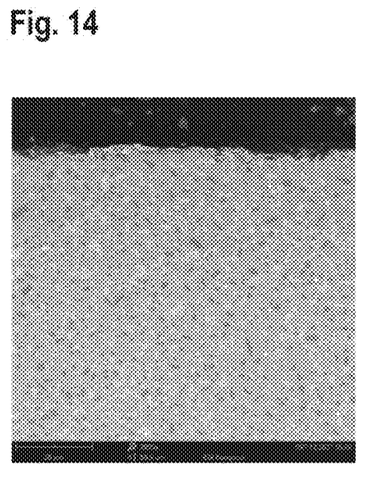

Therefore, to further increase the robustness of the armor plate, the upper side of the armor plate can be sandblasted. FIGS. 12 and 14 show a surface photo and a sectional image onto or through an armor plate according to Specimen E after sandblasting.

Sandblasting was carried out using a continuous belt blasting machine of the company Rosier RSKI 1400. Four blast nozzles and a blasting pressure of 6 bar were used. The distance to the workpiece was 20 cm and the feed rate during sandblasting was 0.2 m/min with a total blasting time of one minute.

"WR—aluminum oxide brown" of the company Werner Rumler Industriebedarf & Strahlmittel GmbH of the category Fepa 80 with a grain size in the range from 149 to 210 µm was used as the blasting medium.

FIG. 12 shows that sandblasting results in a more even surface structure, the roughness of which can be adjusted via the selected sandblasting process.

From the sectional view in FIG. 14, it can be seen that the metallic binder-enriched zone on the upper side of the armor plate has been removed.

Figure 15:
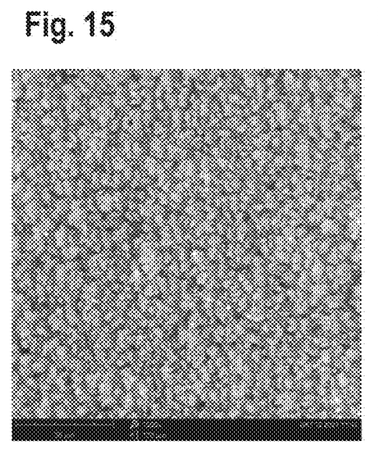
Figure 16:
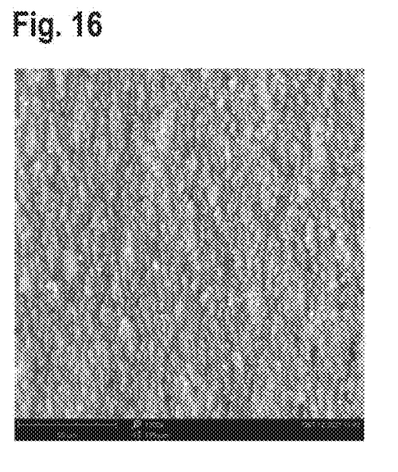
Figure 17:
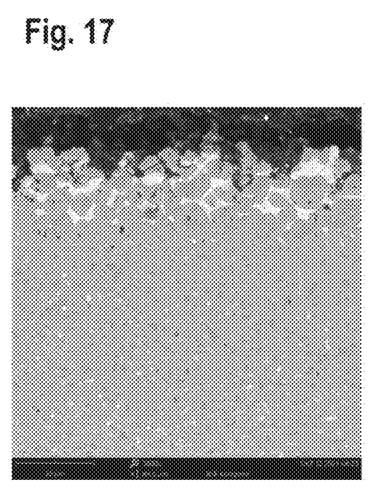
Figure 18:
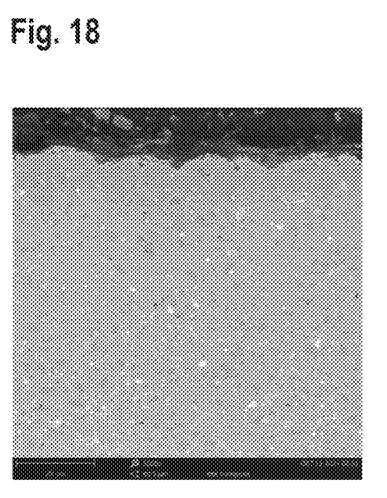

FIGS. 15 to 18 show analogous images for armor plates according to Specimen F, whereby FIGS. 15 and 17 respectively show a surface view and a sectional view before sandblasting, and FIGS. 16 and 18 respectively show a surface view and a sectional view after sandblasting.

The invention claimed is:

1. An armor plate consisting of a material comprising a cermet, wherein the armor plate has a density in the range of from 5.0 to 6.5 g/cm$^3$.

2. The armor plate according to claim 1, wherein the cermet comprises as main component a titanium-based hard material chosen from the group of TiC, TiCN, and combinations thereof.

3. The armor plate according to claim 2, wherein the cermet in addition to the titanium-based hard material comprises a further hard material which is chosen from the carbides of tungsten, molybdenum and mixtures thereof.

4. An armor plate consisting of a material, and wherein the material consists of a cermet comprising 60 to 95 weight percent of a titanium-based hard material, up to 30 weight percent of a further hard material, and 1 to 20 weight percent of a binder, based on the total weight of the material, and wherein the armor plate has a density in the range of from 5.0 to 6.5 g/cm$^3$.

5. The armor plate of claim 4, wherein the armor plate has a density in the range of 5.0 to 6.3 g/cm$^3$.

6. The armor plate of claim 4, wherein the material consists of a cermet comprising 60 to 95 weight percent of a titanium-based hard material, from 1 weight percent up to 30 weight percent of a further hard material, and 1 to 20 weight percent of a binder, based on the total weight of the material.

7. The armor plate of claim 4, wherein the material consists of a cermet comprising 60 to 95 weight percent of a titanium-based hard material, from 8.5 weight percent up to 25 weight percent of a further hard material, and 1 to 20 weight percent of a binder, based on the total weight of the material.

8. The armor plate of claim 4, wherein the material consists of a cermet comprising 65 to 90 weight percent of a titanium-based hard material, up to 30 weight percent of a further hard material, and 1 to 20 weight percent of a binder, based on the total weight of the material.

9. The armor plate of claim 4, wherein the material consists of a cermet comprising 60 to 95 weight percent of a titanium-based hard material, up to 30 weight percent of a further hard material, and 3 to 15 weight percent of a binder, based on the total weight of the material.

10. The armor plate of claim 4, wherein the titanium-based hard material is chosen from the group TiC, TiCN, and combinations thereof.

11. The armor plate of claim 4, wherein the further hard material is chosen from the carbides of tungsten, molybdenum, and mixtures thereof.

* * * * *